United States Patent [19]
Narula et al.

[11] Patent Number: 6,146,602
[45] Date of Patent: Nov. 14, 2000

[54] MESOPOROUS OXIDE MOLECULAR SIEVES FOR ABSORBING NITROGEN OXIDES IN OXIDIZING ENGINE EXHAUST GAS

[75] Inventors: Chaitanya Kumar Narula; Sabine Rita Nakouzi-Phillips, both of Ann Arbor, Mich.

[73] Assignee: Ford Global Technologies, Inc., Dearborn, Mich.

[21] Appl. No.: 09/246,876

[22] Filed: Feb. 8, 1999

[51] Int. Cl.$^7$ .................................................. B01J 23/42
[52] U.S. Cl. ................... 423/213.5; 423/212; 423/213.2; 423/239.1; 502/303; 502/304; 502/328; 502/339; 502/330; 502/344
[58] Field of Search ................................ 423/212, 213.5, 423/213.2, 239.1; 502/339, 303, 304, 328, 330, 344

[56] References Cited

U.S. PATENT DOCUMENTS

| | | | |
|---|---|---|---|
| 5,242,883 | 9/1993 | Ichikawa et al. | 502/439 |
| 5,403,807 | 4/1995 | Narula | 502/303 |
| 5,795,559 | 8/1998 | Pinnavaia et al. | 423/702 |
| 5,851,501 | 12/1998 | Krutzsch et al. | 423/213.2 |
| 5,874,057 | 2/1999 | Deeba et al. | 423/239.1 |
| 5,922,293 | 7/1999 | Miyoshi et al. | 423/213.5 |
| 6,001,319 | 12/1999 | Yokoi et al. | 423/239.1 |
| 6,010,673 | 1/2000 | Kanazawa et al. | 423/213.5 |
| 6,027,706 | 2/2000 | Pinnavaia et al. | 423/600 |

FOREIGN PATENT DOCUMENTS

| | | |
|---|---|---|
| 0 645 173 | 3/1995 | European Pat. Off. . |
| 0 754 494 | 1/1997 | European Pat. Off. . |

OTHER PUBLICATIONS

Disclosed Anonymously, 398/Research Disclosure–Jun. 1997, "Heterometallic Alkoxides as Precursors for the Incorporation of Lanthanides in Alumina Molecular Sieves", No. 39825.

Wenzhong Zhang and Thomas J. Pinnavaia, "Rare Earth Stabilization of Mesoporous Alumina Molecular Sieves Assembled Through an N° I°Pathway", Department of Chemistry and Center for Fundamental Materials Research, Michigan State University, East Lansing MI 48824–1322, USA, p. 1185–1186 (1998) Chem. Commun.

M. Eswaramoorthy, Neeraj and C. N. R. Rao, "High Catalytic Efficiency of Transition Metal Complexes Encapsulated in a Cubic Mesoporous Phase", Chemistry and Physics of Materials Unit, Jawaharlal Nehru Centre for Advanced Scientific Research, Jakkur Post, Bangalore 560 064, India, p. 615–616 (1998) Chem. Commun.

Mitsunori Yada, Masahumi Ohya, Masato Machida and Tsuyoshi Kijima, "Synthesis of Porous Yttrium Aluminium Oxide Templated by Dodecyl Sulfate Assemblies", Department of Materials Science, Faculty of Engineering, Miyazaki University, Miyazaki 889–2192, Japan, p. 1941–1942 (1998) Chem. Commun.

*Primary Examiner*—Tom Dunn
*Attorney, Agent, or Firm*—Lorraine S. Melotik

[57] ABSTRACT

This invention is a catalyst comprising a mesoporous aluminum oxide material including precious metal. The material is made by sol-gel techniques using a neutral surfactant with alkoxides, water and alcohol to form the aluminum oxide material having an interconnected pore structure of mesoporous size. The catalyst is useful to absorb nitrogen oxides from lean-burn engines when the exhaust gas is oxidizing, which may be gasoline or diesel engines. The nitrogen oxides are desorbed when the exhaust is made richer and is reduced over the precious metal with reductants in the gas like hydrocarbons. The alkoxides include aluminum alkoxides and at least one of alkali metal and alkaline earth metal. Preferably, the alkoxides include certain heterometallic alkoxides of aluminum and alkali metals or alkaline earth metals. Optionally, the alkoxides may also include lanthanides. Preferably, the alcohol used to make the oxide has four carbon atoms, most preferably being sec-butanol.

22 Claims, 1 Drawing Sheet

6,146,602

MESOPOROUS OXIDE MOLECULAR SIEVES FOR ABSORBING NITROGEN OXIDES IN OXIDIZING ENGINE EXHAUST GAS

FIELD OF THE INVENTION

This invention is a mesoporous molecular sieve material made by template assisted sol-gel processing useful to absorb nitrogen oxides during lean-burn operation of automotive vehicles. More particularly, the material which includes a precious metal is alumina-based comprising at least one of alkali metal or alkaline earth metal, and optionally a lanthanide metal. Preferably, the alumina-based material is a single phase metal-alumina material made from particular heterometallic alkoxides.

BACKGROUND OF THE INVENTION

It is desirable to operate gasoline engines in a lean-burn mode, where the A/F ratio is higher than stoichiometry, in order to improve fuel economy. The difficulty in treating such oxidizing engine exhaust gases is to convert particularly the nitrogen oxides (NOx) generated in the gases along with the carbon monoxide and hydrocarbons. The first must be reduced while the latter two are oxidized. Lean-burn catalysts to carry out this simultaneous conversion have been less than commercially successful. Of current interest are NOx absorbents often called lean-burn NOx traps. These materials are able to absorb nitrogen oxides from the exhaust gases during lean-burn operation and then later release them when the oxygen concentration in the exhaust gases is reduced. For example, when the A/F ratio is made rich or stoichiometric. Conventional NOx absorbents are alkaline earth metals like barium with a precious metal catalyst like platinum carried on alumina. In a recent application concurrently owned application Ser. No. 09/184,146 filed Nov. 2, 1998 and entitled "Use of Sol-Gel Processed Alumina-based Metal Oxides for Absorbing Nitrogen Oxides in Oxidizing Exhaust Gas", we disclose the unexpected advantage of using sol-gel processed materials which include alkali metal, alkaline earth metal, or their mixture in an alumina matrix. These materials are found to be more resistant to sulfur poisoning than conventional alumina materials.

We have now found that the NOx absorption of sol-gel processed materials, as those of the above referenced application, can be significantly improved by making mesoporous molecular sieve aluminum oxide materials using a surfactant as a template during the sol-gel processing.

Aluminum oxide molecular sieves which incorporate cerium and lanthanum are disclosed in "Heterometallic Alkoxides as Precursors for the Incorporation of Lanthanides in Alumina Molecular Sieves" in Research Disclosure, June 1997, 39825. In "Rare Earth Stabilization of Mesoporous Alumina Molecular Sieves Assembled Through an N°I° Pathway", Chem. Commun., 1998, Zhang and Pinnavaia disclose incorporation of $Ce^{+3}$ or $La^{+3}$ ions in the alumina to improve thermal stability. In "Synthesis of Porous Yttrium Aluminium Oxide Templated by Dodecyl Sulfate Assemblies", Chem. Comm., 1998, Yada et. al. disclose yttrium aluminum oxide with a hexagonal structure. In "High Catalytic Efficiency of Transition Metal Complexes Encapsulated In A Cubic Mesoporous Phase" Rao et.al. disclose preparation of an alumina-silica molecular sieve (Al-MCM-48) employing cetyltrimethylammonium bromide. None of these references disclose, however, forming molecular sieves of the present invention.

In U.S. application Ser. No. 09/134,992 filed Aug. 17, 1998 and entitled "NOx Trap Catalyst For Lean Burn Engines" commonly assigned with the present invention, a sol-gel oxide material is disclosed useful for NOx absorption. It comprises oxides of aluminum, magnesium and zirconium.

SUMMARY OF THE INVENTION

The invention, in one aspect, is an alkali metal or alkaline earths-aluminum oxide molecular sieve including at least 0.1 wt % precious metal useful for treating automotive exhaust gas containing nitrogen oxides generated by a gasoline lean-burn engine. The precious metal is selected from the group consisting of platinum, palladium, rhodium, and a mixture of any of them. The alkali metal or alkaline earths-alumina sieve is a reaction product made by sol-gel techniques of components comprising: a) neutral surfactant; b) alkoxides of (I) aluminum, (II) at least one of: i) alkali metals and ii) alkaline earth metals; and, optionally, (III) a lanthanide metal; c) water; and d) alcohol, the sieve having interconnected pores of mesoporous dimensions. These gels are subsequently washed with a liquid in which the surfactant is soluble and in which the oxide is substantially insoluble to recover the aluminum oxide sieve.

According to another aspect, the invention is a method for treating exhaust gas containing carbon monoxide, hydrocarbons, and nitrogen oxides generated by a lean-burn internal combustion engine, the method comprising the step of: bringing the exhaust gas from said lean-burn engine in contact with the catalyst disclosed above. Under lean-burn conditions, where the exhaust gas contains more oxygen than is required for oxidizing components to be oxidized in the exhaust gas, nitrogen oxides are absorbed on the catalyst and when the oxygen concentration in said gas is lowered the absorbed nitrogen oxides are desorbed from the catalyst and reduced over the precious metal.

The preferred aluminum oxide sieve material is made from alkoxides including certain heterometallic alkoxides which will be discussed in detail below. These heterometallic alkoxides include in the alkoxide molecule aluminum and another metal selected from alkali metal or alkaline earth metal. Optionally, a heterometallic alkoxide of aluminum and lanthanide can also be included. The ratio of alkali metals, alkaline earth metals, and/or lanthanide to alumina in these preferred materials can be changed by including varying amounts of, e.g., single metal alkoxides like aluminum alkoxide, alkaline earth alkoxides, alkali metal alkoxides, or lanthanide alkoxides, with the heterometallic alkoxide during sol-gel processing thereof.

DETAILED DESCRIPTION OF PREFERRED EMBODIMENTS

Figure 1:
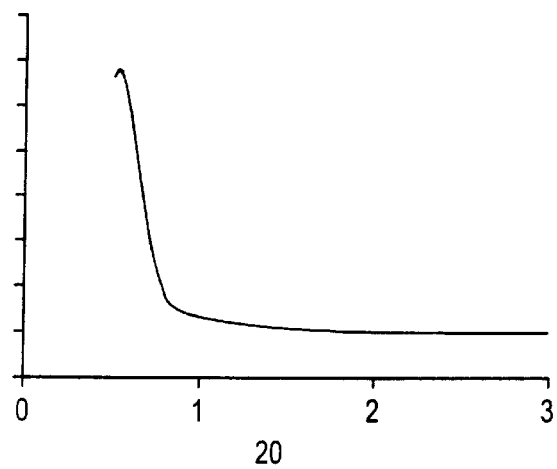
FIG. 1 is a graph showing the x-ray powder diffraction pattern of $BaO.6Al_2O_3$ molecular sieves made according to an embodiment of the present invention.

As disclosed above, the invention is a catalyst comprising precious metal with aluminum oxide material useful for treating exhaust gas containing carbon monoxide, hydrocarbons, and nitrogen oxides generated by a lean-burn internal combustion engine and the catalyst material. This catalyst has the advantage that it has a very high surface area and a structure characterized by repeating arrays of interconnected pores of mesoporous dimensions, hence it is called a molecular sieve. By mesoporous is meant herein pores having a diameter on average of about 10 nm or less.

This porous structure is obtained with the assistance of a particular template, i.e., a neutral surfactant. This surfactant causes the alkoxide molecules to line up in relationship to the surfactant generating the desired porous structure in the final oxide product. The particular optimal pore size desired of the product can be tailored through selection of the template molecule as would be apparent to one skilled in the art in view of the present disclosure.

As disclosed above, the catalyst comprises mesoporous alkali metal or alkaline earths-aluminum oxide molecular sieves including at least 0.1 wt % precious metal selected from the group consisting of platinum, palladium, rhodium and a mixture of any of them. The oxide sieve material is a reaction product, having interconnected pores of mesoporous dimensions, made by sol-gel techniques of components comprising: a) non-ionic polyethyleneoxide surfactant; b) alkoxides; c) water; and d) alcohol. Mixing these components forms an alkali metal or alkaline earths-aluminum oxide material gel which is subsequently washed with a liquid in which the surfactant is soluble and in which the oxide is substantially insoluble to recover the aluminum oxide product.

For use of this sieve in the invention NOx absorption method, the metal oxide material would include precious metal which would either be deposited on the metal oxide or included with the components during sol-gel processing. Under lean-burn conditions, where the exhaust gas contains more oxygen than is required for oxidizing components to be oxidized in the exhaust gas, nitrogen oxides are absorbed on the metal oxide material and when the oxygen concentration in the gas is lowered the absorbed nitrogen oxides are desorbed from the metal oxide and reduced over the precious metal.

One component for forming the mesoporous molecular sieve oxide is a neutral surfactant. By this is meant surfactants that are neither cationic nor anionic. Exemplary of such surfactants are Pluronic, Tergitol, Igepal, Triton etc. Most preferred are the Pluronic family of surfactants which are copolymer of polyethylene_oxide and polypropylene oxide. In one preferred embodiment of alkoxides used, these components are reacted to keep the surfactant concentration of about 25%. The amount of the surfactant will be dependent on the particular alkoxide material used, however.

Yet another component for forming the mesoporous oxide of the present invention are alkoxides which will provide, in the mesoporous oxide, metals comprising: (I) aluminum, (II) at least one of the group:

(a) alkali metals, (b) alkaline earth metals (meaning including a mixture of any of them) and optionally, (III) a lanthanide. The alkoxides may be single metal alkoxides of those metals described above or heterometallic alkoxides of aluminum and another of the metals described above. Preferably the mesoporous molecular sieve oxide is made from heterometallic alkoxides like aluminum-alkali metal or aluminum-alkaline earth metal alkoxide as will be described in detail below.

For example, the mesoporous molecular sieve oxide may be made from mono-metal alkoxides represented by formula $M(OR)_n$ wherein R represents preferably a lower alkyl group, M represents a metal element selected from the group consisting of aluminum, alkali metal, alkaline earth metal and lanthanides, n being the valence of M. By lower alkyl group is meant $C_1$ to $C_6$. The preferred mono-metal alkoxides include alkoxides of aluminum such as its methoxide, ethoxide, propoxide (n- and iso-), and butoxides (n-, sec-, and tert-); alkali metal alkoxides such as methoxide, ethoxide, propoxide (n- and iso-), and butoxides (n-, sec-, and tert-); alkaline earth metal alkoxides such as methoxide, ethoxide, propoxide (n- and iso-), and butoxides (n-, sec-, and tert-); and lanthanide alkoxides such as methoxide, ethoxide, propoxide (n- and iso-), and butoxides (n-, sec-, and tert-). Still others will be apparent to those skilled in the art in view of the present invention. The mesoporous molecular sieve product preferably contains the following weight percents of these components, based on a total of 100 weight percent. That is, (a) aluminum oxide and (b) the total of alkali metal oxide and/or alkaline earth metal oxide, are preferably included in weight percents respectively of (a) 20–80 wt % and (b) 80–20 wt. %. When lanthanum oxide is present, it is included in 10–50 wt. % (based on a total of 100 wt. % of these three oxides in the product). More preferably, in the product oxide, these weight percents are 87–40 wt. %, 3–30 wt. %, and 10–30 wt. % of these three oxides, respectively.

Preferably, as disclosed above, the alkoxides include heterometallic alkoxides such as alkaline earthaluminum alkoxides or alkali metal-aluminum alkoxides.

The alkaline earth-aluminum alkoxides, as well as lanthanide-aluminum alkoxides, which may optionally be used in with the alkaline earth-aluminum alkoxides is disclosed in U.S. Pat. No. 5,403,807, the disclosure of which is hereby expressly incorporated by reference for its teachings. Yet other heterometallic alkoxides useful in the present invention are the alkali metal-aluminum alkoxides disclosed in concurrently owned application Ser. No. 09/184,269 filed Nov. 2, 1998 entitled "Single Phase Metal-Alumina Materials Including Alkali Metals Made From Hetero-metallic Alkoxides", the disclosure of which is hereby expressly incorporated by reference. Optionally the lanthanide heterometallic alkoxides may be used with these alkoxides also.

The preferred heterometallic alkoxides disclosed above to make the mesoporous oxide materials of the present invention are, in detail, the following alkoxides listed with their general chemical formulas. The alkali metal-aluminum heterometallic alkoxide is [bis(2-propanolato)aluminum-bis(-$\mu$-propanolato)]-alkali metal represented by the general chemical formula $M'Al(OPr^i)_4$, M' being an alkali metal. When isolated from reaction mixtures, these alkoxides are polymeric solids with associated solvent molecules e.g $[(Pr^iOH)_2K(\mu\text{-}OPr^i)_2Al\ (\mu\text{-}OPr^i)_2]_n$. The alkaline earth-aluminum hetero-metallic alkoxide is bis[bis(2-propanolato) aluminum)-tetrakis ($\mu$-(2-propanolato)]-alkaline-earth metal represented by the general chemical formula $M[Al(OPr^i)_4]_2$, M being an alkaline earth metal. The lanthanide-aluminum hetero-metallic alkoxide is tris [(bis(2-propanolato) (aluminum)-hexakis-($\mu$-(2-propanolato)]lanthanide represented by the general chemical formula $Ln[Al(OPr^i)_4]_3$, Ln being a lanthanide. Alkali metal is meant to include such metals as lithium (Li), sodium (Na), potassium (K), rubidium (Rb), and cesium (Cs). Alkaline earth metal is meant to include such metals as magnesium (Mg), calcium (Ca), strontium (Sr), and barium (Ba). Lanthanide is meant to include members of the lanthanide series of the Periodic Table such as lanthanum (La) and cerium (Ce). As would be apparent to one skilled in the art in view of the present disclosure, more than one such heterometallic alkoxide could be employed. That is, e.g., alkali metal-aluminum heterometallic alkoxides of both lithium and sodium alkoxides could be employed. Mono-metal alkoxides such as aluminum alkoxide can be added during processing to control the desired ratio of the metals in the final mesoporous product. For example, a potassium-aluminum oxide material used preferably for NOx absorption according to the present invention can be made from alkoxides including [(bis(2-propanolato)-aluminumbis ($\mu$-(2-propanolato) potassium, KAl(OPr$^i$)$_4$. The ratio of alkali metals, alkaline-earth metals and/or lanthanide to alumina can be changed by including varying amounts of one or more mono-metal alkoxides such as aluminum alkoxide, alkaline earth alkoxides, alkali metal alkoxides, and lanthanide alkoxides with the heterometallic alkoxide. Thus the ratio of, e.g., K to alumina is changed, according to the above example, by mixing Al(OPr$^i$)$_3$ with KAl(OPr$^i$)$_4$. A potassium lanthanum-alumina, e.g., may be prepared from KAl(OPr$^i$)$_4$, and La[Al (OPr$^i$)$_4$]$_3$, and optionally Al(OPr$^i$)$_3$.

Advantageously, we believe that these preferred materials made from heterometallic alkoxides as disclosed herein are even more desirable for use as NOx absorbents than those made from all mono-metal alkoxides. In these materials, the metals like alkali metal and lanthanide are see n t o be more uniformly distributed throughout the aluminum oxide matrix and chemically linked into the alumina by bridges such as metal-oxygen-aluminum or metal-hydroxide-aluminum.

Two other components necessary to make the present invention mesoporous oxide are water and alcohol. The alcohol may be secondary butanol or other alcohols which allow formation of the sieve product. For example, 2-propanol prevents the formation of molecular sieves whereas 2-butanol is an ideal solvent. Selection of the various amounts of the components to form the sieve product will be apparent to one skilled in the art in view of the present disclosure. For example, when using the mixture of barium and aluminum alkoxides, the preferred molar concentrations of the components mixed together are 1 of this alkoxides: 0.1 pluronic surfactant: 2.0 water and enough sec-butanol to keep the surfactant concentration 25 wt %.

The sol-gel templating technique of making the mesoporous oxide product involves preparation of a controlled concentration solution of surfactant in a alcohol and the hydrolysis of alkoxides in the presence of such solution. The surfactants and other organics can then be removed by washing carefully with a solvent like ethanol or THF (tetrahydrofuran). Alignment of surfactant molecules in a preferred configuration is concentration dependent and solvent dependent. The resulting powder is then fired to remove organics and impregnated with platinum. Final thermal treatment to remove residual hydroxy groups and to improve adhesion of molecular sieve powder to the substrate can be carried out either prior to deployment on a vehicle or on vehicle.

The mesoporous alkali metal or alkaline earths-aluminum oxide molecular sieve materials may include minor proportions of other materials to stabilize or otherwise enhance the oxide properties. Stabilizer materials such as silica commonly included in oxide materials to be used at elevated temperatures would also be useful herein. When included they would be used in an amount up to about 10 wt. % based on the total weight of the alkali metal or alkaline earths-aluminum oxide material.

For use in absorbing NOx, as disclosed above, the mesoporous alkali metal or alkaline earths-aluminum oxide molecular sieve materials would include a precious metal like platinum, palladium, or rhodium or a mixture of any of them. The precious metal can be loaded on the oxide material or incorporated within the sol-gel material during processing. For example, incipient wetness techniques may be used where the oxide material can be contacted with, e.g., hexachloroplatinic acid solution to deposit platinum. The impregnated product would be dried and calcined generally before use.

Alternately, the platinum could be included in the sol as, e.g., platinum 2-ethyl hexanoate. In this case, rather than the platinum being merely loaded on the metal oxide it would be included within the metal oxide.

The precious metal included in the alkali metal or alkaline earths-alumina molecular sieve material is incorporated in an amount of at least 0.1 wt. % based on the total weight of the mesoporous alkali metal or alkaline earths-aluminum oxide molecular sieve material. Preferably, the precious metal is employed in an amount of 0.1 to 5 wt. % based on the weight of the oxide, more preferably being included in about 1 to 2 wt. %. For wet impregnation, as one example, the precious metal may be provided from soluble precious metal compounds. Water soluble compounds are preferred, including, but not limited to nitrate salts. In addition to this incorporation from a liquid phase, the precious metal, e.g., platinum, may be provided by sublimation of platinum chloride or other volatile platinum salts: by solid state exchange in the 300–500SC temperature range using labile platinum compounds. Platinum is the preferred precious metal, however, when platinum is included other precious metal like rhodium in relatively small amounts is desirably also added, optimally as 1–5 wt. % rhodium based on the weight of the support.

Rhodium is desirably included since it provides a broadening of the NOx conversion window due to increased conversion efficiency of nitrogen oxides at higher temperatures.

Using the neutral surfactant as a template was found to provide the final product with molecular sieve structures of interconnected pores. These pores are distributed throughout the product material and substantially uniformly distributed there through. This is not to mean that all of the pores are connected to one another but that they form a "worm-like" motif in the product as such term is known in the art. This product was found to be structurally stable at the high temperatures such as those experienced by an automotive exhaust gas. When using this material for NOx absorption according to the present invention, the NOx absorption was found to be significantly improved as compared to a sol-gel processed material which did not include formation of molecular sieve connected pores in the oxide product. We believe that the improved NOx absorption results from improved surface properties and pore connectivity which results in facile movement inside the pores and reaction with catalyst metal like platinum dispersed within the structure. This theory is advanced in an attempt to explain the unexpected and advantageous absorption properties of the present invention mesoporous molecular sieve materials as compared to other sol-gel process materials not using the templating technique. However, neither the validity nor understanding of this theory is necessary for practice of the present invention.

For useful application as an absorbent material in an exhaust system, a coating of the invention catalyst material will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the absorbent/catalyst of this invention. It is preferred that the surface area of the monolithic structure provide 50–100 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the mesoporous alkali metal-alkaline earths-aluminum oxide molecular sieve material (without the precious metal) may be applied to the substrate and then impregnated with the precursor precious metal solution. Alternately, the oxide material with precious metal may be washcoated onto the substrate by forming a slurry thereof. Generally, the oxide is provided first on the substrate and then impregnated with a precious metal precursor. Still other ways of providing the invention absorbent product will be apparent to those skilled in the art in view of the present disclosure, the method not being critical to the present invention. Generally, for use in an exhaust system this impregnated washcoat is subjected to elevated temperatures to decompose and eliminate the functional group of the precious metal precursor. It may be further subjected to calcining. During calcining, metal particles attain their equilibrium size at calcining temperature. Optimally, the substrate carries a washcoat of the final absorbent material in an amount of between about 20% and 40% by weight based on the weight of the substrate (e.g., monolith).

When the absorbent is placed in use, oxygen present in the exhaust gas will oxidize the precious metal like platinum to platinum oxide which at high temperatures decomposes to platinum and oxygen. Thus it often exists as a mixture of platinum and its oxides.

The method of absorbing NOx according to the present invention may be comprised of the step of placing another catalyst device as, for example, a catalytic converter employing a conventional three-way catalyst containing palladium, etc., or a lean-burn catalyst such as one containing transition metals like silver, copper, etc. in the exhaust gas passage. The three-way catalyst, for example, can be placed upstream of the NOx trap, hence closer to the engine. In such an arrangement, the three-way catalyst being preferably closely mounted to the engine would warm up quickly and provide for efficient engine cold start emission control. The NOx absorbent would be positioned downstream of the three-way catalyst where the lower exhaust gas temperature enables maximum NOx absorption efficiency. The lean-burn catalyst, if employed may be placed before or after the lean burn NOx trap depending on the NOx removal strategy.

As discussed above, during periods of lean-burn engine operation when NOx passes through the three-way catalyst, NOx is stored on the absorbent. The NOx absorbent is periodically regenerated by short periods or intervals of slightly rich engine operation. Thus, the stored NOx is then released (purged) from the trapping material and is catalytically reduced over a precious metal like platinum in the absorbent material by the excess hydrocarbons and other reductants like CO and $H_2$, present in the exhaust gas. In general, the released NOx is efficiently converted to $N_2$ and $CO_2$ which efficiency is enhanced when rhodium is contained within the NOx absorbent washcoat. However, one may wish to place a second three way catalyst downstream of the NOx absorbent in order to further aid in this regard. As disclosed above, the invention NOx absorbent is to be used for gasoline engines where during lean-burn operation the air/fuel ratio is usually in the range 19–27. In addition, the invention NOx absorbent may be used for diesel engines which also operate in lean-burn conditions. In order to provide the more reducing atmosphere, materials like urea and hydrocarbons, as from diesel fuel, may be injected into the absorbent or into the absorbent stream entering the absorbent to provide for the regeneration of the absorbent.

EXAMPLE 1

Ba[Al(O$^i$Pr)$_4$]$_2$ (3.41g), Al(O$^i$Pr)$_3$ (10. 94 g) and P64L (20.1 g, available from BASG, AG) are dissolved in sec-butanol (83 ml) with gentle heating and stirring. The resulting clear solution is treated with water (2.5 ml) mixed with sec-butanol (33 ml). A gel forms immediately which was allowed to stand overnight. The is filtered to remove solvent and washed several times to remove excess template. The powder, thus obtained is pyrolyzed at 600° C. to obtain mesoporous molecular sieves of BaO.6Al$_2$O$_3$ according to an embodiment of the present invention. The BET surface area of the powder is 283 m$^2$/g and BJH (Barrett, Johner, and Halenda) pore size is 52.4 Å. FIG. 1. Shows the X-ray powder diffraction pattern of this molecular sieve (MS). From this figure it can be seen that the material has a diffraction peak at 2θ=1° due to ordered arrays of pores.

Figure 2:
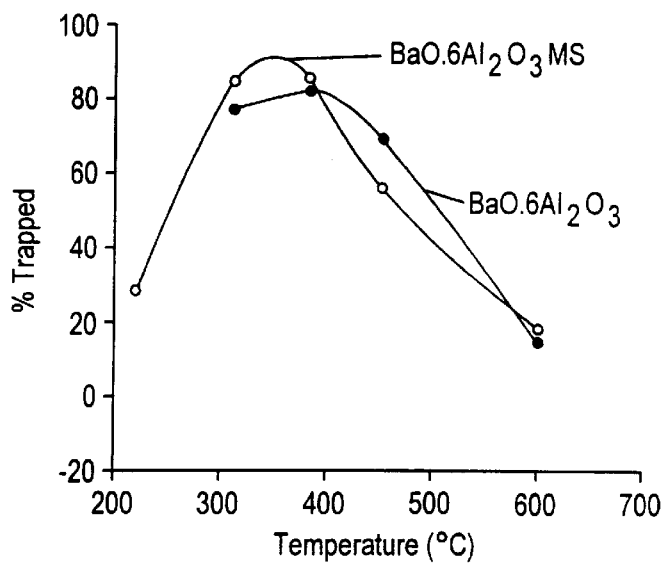
FIG. 2 is a graph showing the NOx trapping ability of $BaO.6Al_2O_3$ molecular sieves of FIG. 1. For comparison, the trapping efficiency of sol-gel, non-molecular sieve $BaO.6Al_2O_3$ (not according to the present invention) is also shown.

FIG. 2 shows that NOx trapping efficiency of the molecular sieve BaO.Al$_2$O$_3$ (MS)is 85% at 380° C.

EXAMPLE 2

Figure 3:
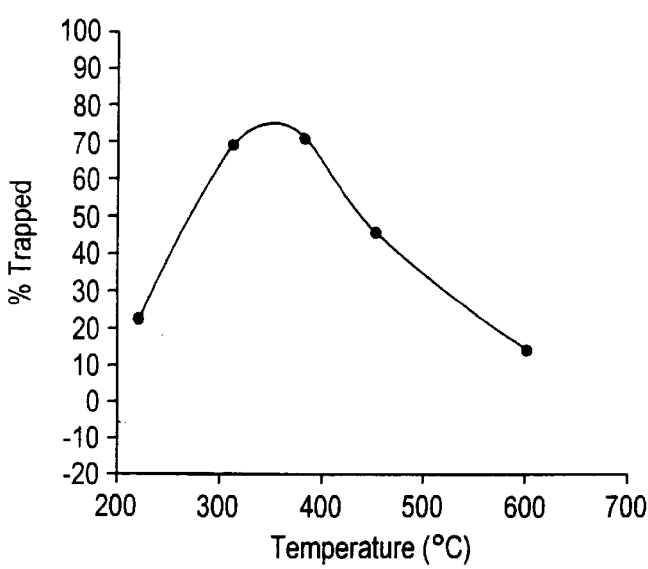
FIG. 3 is a graph showing the NOx trapping ability of $K-Al_2O_3$ molecular sieve made according to an embodiment of the present invention.

Al(OiPr)$_3$ (9.97g), K(OiPr) (0.48g) and P64L (15.5 g, available from BASF, AG) are dissolved in sec-butanol (64 ml)with gentle heating and stirring. The resulting clear solution is treated with water (1.9 ml) mixed with sec-butanol (25 ml). A gel forms immediately which was allowed to stand overnight. The is filtered to remove solvent and washed several times to remove excess template. The powder, thus obtained is pyrolyzed at 600° C. to obtain mesoporous molecular sieves of K-Al$_2$O$_3$ according to an embodiment of the present invention. The BET surface area of the powder is 366 m$^2$/g and BJH pore size is 92 Å. Its NOx trapping ability is shown in FIG. 3. From this figure it can be seen that it can trap 72% of NOx at 380° C.

EXAMPLE 3

Al(OiPr)$_3$ (8.98g), KAl(OiPr) (1.47g) and P64L (15.5 g, available from BASF, AG) are dissolved in sec-butanol (64 ml)with gentle heating and stirring. The resulting clear solution is treated with water (1.9 ml) mixed with sec-butanol (25 ml). A gel forms immediately which was allowed to stand overnight. The is filtered to remove solvent and washed several times to remove excess template. The powder, thus obtained is pyrolyzed at 600° C. to obtain mesoporous molecular sieves of K-Al$_2$O$_3$ according to an embodiment of the present invention. The BET surface area of the powder is 366 m$^2$/g and BJH pore size is 92 Å.

The following example is described for comparison only and is not made according to the present invention.

EXAMPLE 4

Ba[Al(OiPr)$_4$]$_2$ (3.41g) and Al(OiPr)$_3$ (10.94 g) are dissolved in 2-propanol 83 ml)with stirring. The resulting clear solution is treated with water (2.5 ml) mixed with 2-propanol 33 ml). No surfactant is used. A gel forms immediately which is allowed to stand overnight and dried. The dried gel (xerogel) is pyrolyzed at 600° C. to obtain a free flowing powder. The BET surface area of the powder is 190 m$^2$/g and average pore size is 56 Å. It's NOx trapping ability is shown in FIG. 2 for comparison with the molecular sieve (MS) material of Example 1. The same alkoxides are used in the Example I and III procedure. It can be seen from FIG. 2 that the molecular sieve material (MS) of Example I had significantly improved NOx trapping as compared to the Example 4 material.

We claim:

1. A catalyst comprising a mesoporous aluminum oxide material molecular sieve including at least 0.1 wt % precious metal selected from the group consisting of platinum, palladium, rhodium and a mixture of any of them, useful for treating lean-burn automotive exhaust gas containing nitrogen oxides, said mesoporous aluminum oxide material being the reaction product made by sol-gel techniques of components comprising:

a. neutral surfactant;

b. alkoxides of (I) aluminum, (II) at least one of: i) alkali metals and ii) alkaline earth metals, and optionally (III) a lanthanide metal;

c. water; and d. alcohol;

wherein said components are mixed to form an aluminum oxide material gel which is subsequently washed with a liquid in which the surfactant is soluble and in which the oxide is substantially insoluble to recover the aluminum oxide product which comprises interconnected mesoporous size pores throughout the product.

2. The catalyst according to claim 1 wherein said alumina oxide material includes 20–80 wt. % aluminum oxides and 80–20 wt. % of the total of alkali metal oxides and alkaline earth metal oxides.

3. The catalyst according to claim 2 wherein said aluminum oxide material includes 10–50 wt. % oxides of a lanthanide.

4. The catalyst according to claim 1 wherein said alkali metal is selected from the group consisting of lithium, potassium, sodium, cesium, and a mixture of any of them.

5. The catalyst according to claim 1 wherein said alkaline earth metal is selected from the group consisting of calcium, barium, strontium, magnesium, and a mixture of any of them.

6. The catalyst according to claim 1 wherein said lanthanide is selected from the group consisting of Lanthanum, cerium, and their mixture.

7. The catalyst according to claim 1 wherein said precious metal is either included during sol-gel processing of said oxide or loaded on the oxide material product.

8. The catalyst according to claim 1 wherein said alcohol is an alcohol with four carbon atoms.

9. The catalyst according to claim 1 which further comprises placing a three-way catalyst either upstream or downstream of the catalyst.

10. The catalyst according to claim 1 wherein said alkoxides include heterometallic alkoxide comprising at least one of: I. (a) [bis(2-propanolato)-aluminumbis-(-$\mu$(2-propanolato)]alkali metals and (b) bis[(bis(2-propanolato)-aluminum) tetraakis-$\mu$-(2-propanolato))]alkaline earth; and, optionally, II. tris[(bis(2-propanolato)-aluminum)hexakis-($\mu$-(2-propanolato))]lanthanides.

11. A method for treating exhaust gas containing carbon monoxide, hydrocarbons, and nitrogen oxides generated by a lean-burn internal combustion engine, the method comprising the step of:

bringing said exhaust gas from said lean-burn engine in contact with a catalyst comprising an aluminum oxide material molecular sieve including at least 0.1 wt % precious metal selected from the group consisting of platinum, palladium, rhodium, and a mixture of any of them, said aluminum oxide material sieve being the reaction product by sol-gel techniques of components comprising:

a. neutral surfactant;

b. alkoxides of (I) aluminum, (II) at least one of: i) alkali metals and ii) alkaline earth metals, and optionally, (III), a lanthanide metal;

c. water; and d. alcohol;

wherein said components are mixed to form an aluminum oxide material gel which is subsequently washed with a liquid in which the surfactant is soluble and in which the oxide is substantially insoluble to recover the aluminum oxide material which includes interconnected pores of mesoporous dimensions; wherein under lean-burn conditions, where said exhaust gas contains more oxygen than is required for oxidizing components to be oxidized in the exhaust gas, nitrogen oxides are absorbed on said catalyst material and when the oxygen concentration in said gas is lowered the absorbed nitrogen oxides are desorbed and reduced over said precious metal.

12. The method according to claim 11 wherein said aluminum oxide material includes 20–80 wt. % aluminum oxides and 80–20 wt. % of the total of alkali metal oxides and alkaline earth metal oxides.

13. The method according to claim 12 wherein said aluminum oxide material includes 10–50 wt. % oxides of a lanthanide.

14. The method according to claim 11 wherein said alkali metal is selected from the group consisting of lithium, potassium, sodium, cesium, and a mixture of any of them.

15. The method according to claim 11 wherein said alkaline earth metal is selected from the group consisting of calcium, barium, strontium, magnesium, and a mixture of any of them.

16. The method according to claim 11 wherein said lanthanide is selected from the group consisting of lanthanum, cerium, and their mixture.

17. The method according to claim 11 wherein said precious metal is either included during sol-gel processing of said aluminum oxide material or loaded on the aluminum oxide product.

18. The method according to claim 11 wherein said alcohol has four carbon atoms.

19. The method according to claim 11 which further comprises placing a three-way catalyst either upstream or downstream of the catalyst.

20. The method according to claim 11 wherein said alkoxides included heterometallic alkoxide comprising at least one of: I. (a) [bis(2-propanolato)-aluminumbis-(-$\mu$(2-propanolato)]alkali metals and (b) bis[(bis(2-propanolato)-aluminum) tetraakis-($\mu$-(2-propanolato))]alkaline earth; and, II. optionally, tris[(bis(2-propanolato)-aluminum)hexakis-($\mu$-(2-propanolato))]lanthanides.

21. The catalyst according to claim 1 wherein said neutral surfactant is polyethylene oxide or polypropylene oxide surfactant.

22. The method according to claim 11 wherein said neutral surfactant is polyethylene oxide or polypropylene oxide surfactant.

* * * * *